United States Patent
Michibata

(10) Patent No.: US 9,880,502 B2
(45) Date of Patent: Jan. 30, 2018

(54) LIGHT EMITTING DEVICE AND IMAGE FORMING APPARATUS

(71) Applicant: Konica Minolta, Inc., Chiyoda-ku (JP)

(72) Inventor: Takumi Michibata, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 84 days.

(21) Appl. No.: 14/261,984

(22) Filed: Apr. 25, 2014

(65) Prior Publication Data
US 2014/0321875 A1 Oct. 30, 2014

(30) Foreign Application Priority Data

Apr. 26, 2013 (JP) .................................. 2013-93835

(51) Int. Cl.
| F21V 21/00 | (2006.01) |
| G03G 15/00 | (2006.01) |
| F21V 8/00  | (2006.01) |

(52) U.S. Cl.
CPC ....... *G03G 15/5016* (2013.01); *G02B 6/0051* (2013.01); *G02B 6/0088* (2013.01)

(58) Field of Classification Search
CPC ............................ G02B 6/0088; G02B 6/0051
See application file for complete search history.

(56) References Cited

U.S. PATENT DOCUMENTS

| 2004/0136682 A1 | 7/2004 | Watanabe | |
| 2005/0099823 A1* | 5/2005 | Choi | G02B 6/0038 362/561 |
| 2007/0153548 A1 | 7/2007 | Hamada et al. | |
| 2007/0279941 A1* | 12/2007 | Koshio | G02B 6/0031 362/623 |
| 2009/0060555 A1* | 3/2009 | Okada | B41J 3/46 399/81 |
| 2009/0086506 A1* | 4/2009 | Okumura | G02B 6/0041 362/613 |
| 2010/0002169 A1* | 1/2010 | Kuramitsu | G02B 6/0021 349/65 |
| 2011/0090426 A1 | 4/2011 | Choi et al. | |

(Continued)

FOREIGN PATENT DOCUMENTS

| CN | 102042542 A | 5/2011 |
| CN | 102079182 A | 6/2011 |

(Continued)

OTHER PUBLICATIONS

English Translation of Hwang KR20100108003, published Oct. 2010.*

(Continued)

*Primary Examiner* — Evan Dzierzynski
(74) *Attorney, Agent, or Firm* — Buchanan Ingersoll & Rooney PC

(57) ABSTRACT

A light emitting device includes a light source, a light guide plate, a diffusion sheet, and a lens. The light source is configured to perform partial light emission. The light guide plate is configured to guide light from the light source. The diffusion sheet is stacked over the light guide plate with a gap defined between the light guide plate and the diffusion sheet, and is configured to diffuse the light guided by the light guide plate. The lens is stacked on the diffusion sheet and has an upper surface serving as a light emitting surface.

17 Claims, 10 Drawing Sheets

(56) References Cited

U.S. PATENT DOCUMENTS

| | | | |
|---|---|---|---|
| 2011/0109941 A1 | 5/2011 | Kasai et al. | |
| 2012/0069263 A1* | 3/2012 | Hur | G02B 6/0038 349/61 |
| 2012/0113672 A1* | 5/2012 | Dubrow | B82Y 20/00 362/602 |
| 2012/0147277 A1* | 6/2012 | Yamamoto | G02B 6/0021 348/790 |
| 2012/0230056 A1* | 9/2012 | Hanaoka | H05B 33/0854 362/612 |
| 2013/0094246 A1 | 4/2013 | Kim et al. | |
| 2014/0092625 A1* | 4/2014 | Lin | G02B 6/005 362/606 |

FOREIGN PATENT DOCUMENTS

| | | |
|---|---|---|
| CN | 202165953 U | 3/2012 |
| JP | 55-108473 U | 7/1980 |
| JP | 02-035291 U | 3/1990 |
| JP | 06-010901 U | 2/1994 |
| JP | 2002-100232 A | 4/2002 |
| JP | 2004-206904 A | 7/2004 |
| JP | 2006-156324 | 6/2006 |
| JP | 2012-138345 | 7/2012 |
| KR | 2010108003 | * 10/2010 |

OTHER PUBLICATIONS

Office Action (First Notification of Opinion on Examination) dated Sep. 25, 2015, by the State Intellectual Property Office of the People's Republic of China in corresponding Chinese Patent Application No. 201410171663.X, and an English Translation of the Office Action. (17 pages).

Office Action (Decision of Final Rejection) dated Aug. 12, 2015, by the Japanese Patent Office in corresponding Japanese Patent Application No. 2013-093835 and an English translation of the Office Action. (6 pages).

Office Action (Notification of Reasons for Refusal) dated May 20, 2015, by the Japanese Patent Office in corresponding Japanese Patent Application No. 2013-093835 and an English translation of the Office Action. (5 pages).

Office Action dated May 13, 2016, by the State Intellectual Property Office of China in corresponding Chinese Patent Application No. 201410171663.X and English translation of the Office Action.(20 pages).

* cited by examiner

LIGHT EMITTING DEVICE AND IMAGE FORMING APPARATUS

CROSS-REFERENCE TO RELATED APPLICATIONS

The present application claims priority under 35 U.S.C. § 119 to Japanese Patent Application No. 2013-093835, filed Apr. 26, 2013. The contents of this application are incorporated herein by reference in their entirety.

BACKGROUND OF THE INVENTION

Field of the Invention

The present invention relates to a light emitting device and an image forming apparatus.

Discussion of the Background

Light emitting devices that include a light guide member to guide light from a light source are used in various applications such as an illuminating device, a display device, and a backlight of a liquid crystal display. In recent years, light emitting diodes (LEDs) have been widely used to achieve lower power consumption and a smaller device size. Light emitting devices, particularly those using LEDs as the light source, include a light guide member to achieve surface light emission with the LEDs as point light sources. Such a light emitting device, including the light guide member, includes a direct light emitting device and a side light emitting device (see Japanese Unexamined Patent Application Publication No. 2012-138345). In the direct light emitting device, the light source is disposed directly beneath an opposing surface of a light-emitting surface of the light guide member. In the side light emitting device, the light source is disposed on a side of a side surface adjacent to the light-emitting surface of the light guiding member. The side light emitting device can be made smaller in thickness than the thickness of the direct light emitting device, and thus is used for various display devices and illumination devices to achieve smaller device size.

As shown in FIG. 10, a conventional light emitting device includes a light source 200, a light guide plate 300, a diffusion sheet 400, and a display lens 500. The light source 200 is provided with a plurality of LEDs 201. The light guide plate 300 receives, on its side surface, irradiation light from the light source 200. The diffusion sheet 400 diffuses the light guided by the light guide plate 300. The display lens 500 focuses the light diffused by the diffusion sheet 400 onto a display area. In the conventional light emitting device, the light guide plate 300, the diffusion sheet 400, and the display lens 500 are in close contact with each other. Thus, when during fabrication of the light emitting device a foreign object such as dust enters between the light guide plate 300 and the diffusion sheet 400, or between the diffusion sheet 400 and the display lens 500, the foreign object come into pressure contact between the components. Specifically, the foreign object might be encapsulated between the light guide plate 300 and the diffusion sheet 400 or between the diffusion sheet 400 and the display lens 500, due to the entrance of the foreign object during the fabrication, and the like.

When the foreign object is in pressure contact between the light guide plate 300 and the diffusion sheet 400, or between the diffusion sheet 400 and the display lens 500, the light is guided through a portion including the foreign object. Thus, even when the LED 201, which irradiates the portion including the foreign object with light, is not lit in the light source 200, the light might be guided by the portion including the foreign object. As a result, the light might be emitted from an area out of the luminescent display range in the display lens 500. Thus, when the conventional light emitting device is used as a state display device that indicates the state of an apparatus with a display pattern for example, light might be emitted in a way unintended with the display pattern, due to the foreign object included, thereby degrading the display quality.

In view of such a problem, an object of the present invention is to provide a light emitting device that eliminates or minimizes the degradation of the light emitting quality due to the foreign object included, and an image forming apparatus including the light emitting device.

SUMMARY OF THE INVENTION

According to one aspect of the present invention, a light emitting device includes a light source, a light guide plate, a diffusion sheet, and a lens. The light source is configured to perform partial light emission.

The light guide plate is configured to guide light from the light source. The diffusion sheet is stacked over the light guide plate with a gap defined between the light guide plate and the diffusion sheet, and is configured to diffuse the light guided by the light guide plate. The lens is stacked on the diffusion sheet and has an upper surface serving as a light emitting surface.

According to another aspect of the present invention, an image forming apparatus is configured to form an image on a recording medium and discharge the recording medium. The image forming apparatus includes a state display device configured to display, as a notification to an outside, an operation state of the image forming apparatus. The state display device includes the above-described light emitting device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

First Embodiment

Figure 1:
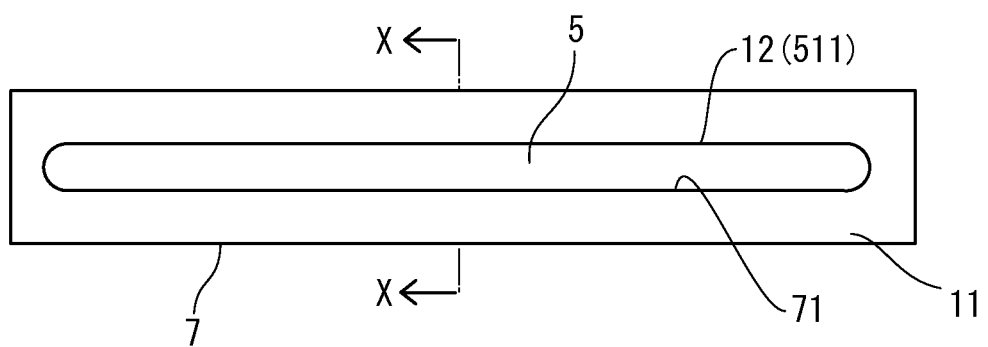
FIG. 1 is a plan view showing a configuration of a light emitting device according to a first embodiment of the present invention.
Figure 2:
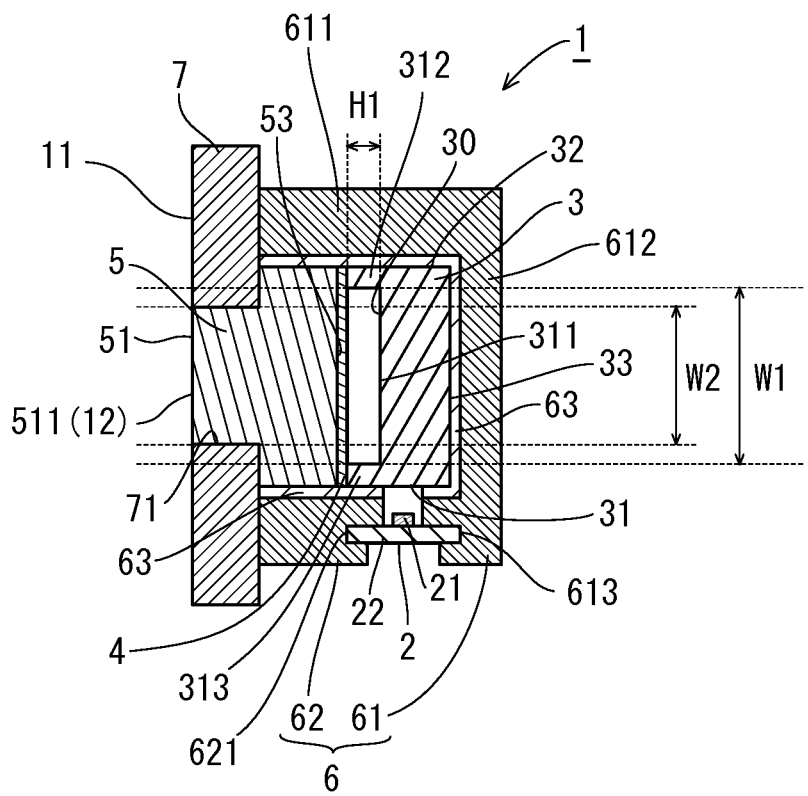
FIG. 2 is a schematic cross-sectional view showing an inner configuration of the light emitting device shown in FIG. 1.
Figure 3:
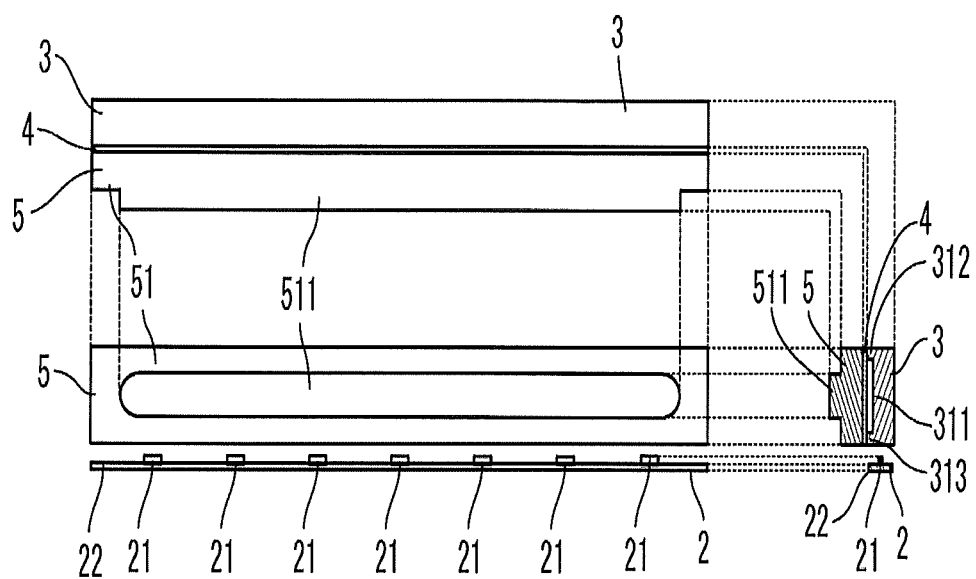
FIG. 3 is a schematic view showing a relative relationship among components in the light emitting device shown in FIG. 1.
Figure 4:
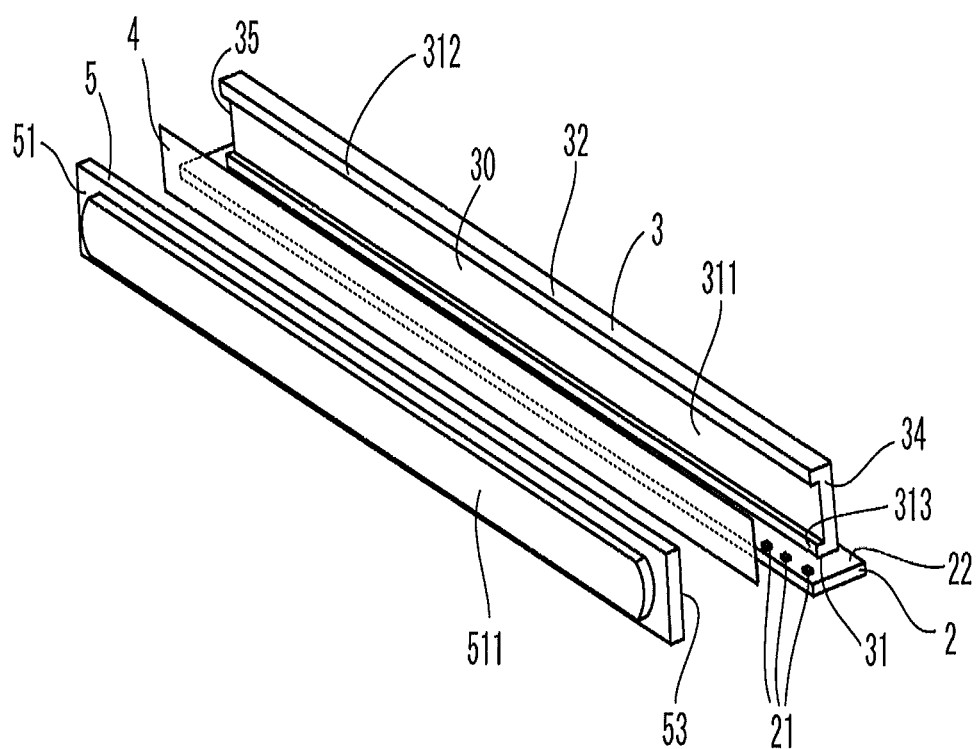
FIG. 4 is an exploded perspective view showing a relative relationship among the components in the light emitting device shown in FIG. 1.

A first embodiment of the present invention will be described below by referring to the drawings. FIG. 1 is a plan view showing a configuration of a light emitting device according to this embodiment. FIG. 2 is a cross-sectional view of the light emitting device shown in FIG. 1, taken along the line X-X. FIG. 3 is a diagram showing a relative relationship among components of the light emitting device shown in FIG. 1. FIG. 4 is an exploded perspective view of the light emitting device. In the embodiments described below, including this embodiment, the left and right direction of the light emitting device in FIG. 2 is defined as "upper and lower direction". Specifically, the embodiments are described below with the left side direction in FIG. 2 being the upper side direction of the light emitting device.

As shown in FIGS. 1 to 4, a light emitting device 1 according to this embodiment includes a light source 2, a light guide plate 3, a diffusion sheet 4, a display lens 5, and a supporting member 6. In the light source 2, a plurality of LEDs 21, as light sources, are mounted on a base plate 22. The light guide plate 3 receives light from the light source 2 with a side surface 31, and guides the light toward a light emitting surface 11 of the light emitting device 1. The diffusion sheet 4 diffuses the light from the light guide plate 3. The display lens 5 guides the light diffused by the diffusion sheet 4 to a display area 12 of the light emitting surface 11. The components 2 to 5 are supported by and secured to the supporting member 6. The supporting member 6 is secured to a casing 7 by screwing and the like, and the components 2 to 5 are clamped by the supporting member 6 and the casing 7. Thus, the light emitting device 1 is secured to the casing 7, and thus is formed as an illumination device or a display device.

In the light emitting device 1 having the configuration described above, the light source 2 is formed by arranging the LEDs 21 on the base plate 22 in a row at predetermined intervals, as shown in FIG. 3. Here, in the base plate 22, an unillustrated circuit that lights each of the mounted LEDs 21 individually is disposed. Thus, the lighting pattern of the LEDs 21 is changeable by an external control device electrically coupled to the circuit. Thus, the lighting pattern of the light emitting device 1 is changeable based on an instruction from the external control device. For example, the LEDs 21 in FIG. 3 are sequentially lit from the left side in FIG. 3, to change the length of the light emitting surface of the light emitting device 1.

The supporting member 6 includes a first supporting member 61 having an approximately L-shaped cross section and a second supporting member 62 having a plate shape. Each of the first and the second supporting members 61 and 62 is provided with a light reflecting layer 63, on an inner wall surface. Thus, the supporting member 6 serves both as a light-shielding member that prevents the light guide plate 63 from being irradiated with light from the outside, and as a reflecting member that reflects the light from the light source 2 into the light guide plate 3 with the light reflecting layer 63.

The first supporting member 61 includes a side plate 611 and a bottom plate 612. The side plate 611 is fixedly attached to the casing 7 in such a manner as to stand on a rear surface of the casing 7. The bottom plate 612 is disposed on a side end portion of the side plate 611, opposite to a portion coupled to the casing 7. The bottom plate 612 includes an engagement portion 613 at an end portion opposite to a portion coupled to the side plate 611. One end side of a base plate 22 of the light source 2 is engaged with the engagement portion 613. The second supporting member 62 includes an engagement portion 621. The engagement portion 621 stands from the casing 7 to extend to the engagement portion 613 of the bottom plate 612 of the first supporting member 61, with one end side fixedly adhered to the casing 7. The other end of the engagement portion 621 engages with the other end of the base plate 22.

Specifically, the engagement portions 613 and 621 of the respective first and second supporting members 61 and 62 are positioned to face each other. The base plate 22 is engaged with the engagement portions 613 and 621 with end sides respectively inserted in the engagement portions 613 and 621. Thus, the light source 2 is secured to the supporting member 6 while closing the space between the engagement portions 613 and 621. Thus, the light source 2 is disposed in the light source device 1, in such a manner that the light emitting surface of the LED 21 faces a side surface 31 of the light guide plate 3.

As shown in FIG. 2, the light guide plate 3 has the side surface 31 facing the light emitting surface of the LEDs 21 of the light source 2, as well as a side surface 32 opposite to the side surface 31 and the bottom surface 33 covered by the light reflecting layer 63 on the inner wall surface of the first supporting member 61. The light guide plate 3 includes a recess 311 in an upper surface 30. The diffusion sheet 4 is stacked on the upper side of the upper surface 30. Specifically, the upper surface 30 of the light guide plate 3 has protrusions 312 and 313 formed by making both side edges along the longitudinal direction protruded toward the diffusion sheet 4. The recess 311 is disposed at a position between the protrusions 312 and 313 at both end edges.

In the light guide plate 3 having the configuration described above, the recess 311 extends from a side surface (one end surface) 34 to a side surface (the other end surface) 35 of the light guide surface 3. Thus, the side surfaces 34 and 35 of the light guide plate 3 form an approximately U shape. With the recess 311 disposed in the upper surface 30 of the light guide plate 3, a gap is defined between the light guide plate 3 and the diffusion sheet 4 by the recess 311. With a depth H1 of the recess 311 being not smaller than 0.1 mm, the space formed by the recess 311 has a height exceeding the size of the dust entered between the light guide plate 3 and the diffusion sheet 4, during fabrication of the light emitting device 1 for example. Thus, the foreign object such as dust entered between the light guide plate 3 and the diffusion sheet 4 is prevented from being in pressure contact with the light guide plate 3 and the diffusion sheet 4.

When the depth H1 of the recess 311 increases, the distance between the bottom surface of the recess 311 and the diffusion sheet 4 increases, thereby widening the light guide range for the irradiation light from the LEDs 21. With the depth H1 of the recess 311 exceeding 30 mm, when the LEDs 21 are lit, the light is emitted in a range wider than a light emitting range regarded as being optimum in the display area 12 of the light emitting device 1. Thus, to achieve the optimum light emitting range in the display area 12, the depth H1 of the recess 311 is preferably set to be not larger than 30 mm. In the light emitting device 1 according to this embodiment formed as the side light emitting device, the depth H1 is more preferably set to be not larger than 5 mm, to emit the light in the optimum light-emission range in the display area 12 of the light emitting device 1.

The recess 311 in the upper surface 30 of the light guide plate 3 is formed with a width W1 of the recess 311 being wider than a width W2 of the display area 12 of the light emitting device 1, in a direction orthogonal to the longitudinal direction of the light emitting device 1. Thus, the protrusions 312 and 313 disposed at both side edges in the upper surface 30 of the light guide plate 3 are disposed further on the outer side than the display area 12. This eliminates or minimizes the degradation of the illumination quality due to the protrusions in the upper surface 30 of the light guide plate 3, such as the non-uniform brightness in the display area 12 of the light emitting device 1. The light guide plate 3 is mainly formed of a resin material including, for example, an acryl resin, a polystyrene resin, and a polycarbonate resin.

For example, the diffusion sheet 4 includes a polyethylene terephthalate (PET) resin film including a light diffusing agent, and is provided with an uneven light diffusion layer on its surface. For example, the diffusion sheet 4 formed as a film with a thickness of 50 μm to 300 μm is set to have the length of approximately 100 mm in the longitudinal direction. Thus, the diffusion sheet 4 has sufficient rigidity, and thus is buckled toward the recess 311 of the light guide plate 3 under its own weight. The diffusion sheet 4 has the front surface in contact with the entire bottom surface 53 of the display lens 5, and has the rear surface in contact with the entire upper surfaces of the protrusions 312 and 313 of the light guide plate 3. Thus, the diffusion sheet 4 is clamped by the display lens 5 and the light guide plate 3 respectively positioned above and below.

The display lens 5 is mainly formed of a resin material including, for example, an acryl resin, a polystyrene resin, and a polycarbonate resin, similarly to the light guide plate 3. A protrusion 511, which forms the display area 12, is disposed in the upper surface 51 of the display lens 5 and is inserted in an opening 71 formed in the casing 7. Thus, when the protrusion 511 is inserted in the opening 71 of the casing 7 so that the display lens 5 is secured, the protrusion 511 is disposed outside the casing 7. An outer wall surface of the casing 7, surrounding the protrusion 511, defines the light emitting surface 11 of the light emitting device 1, and the protrusion 511 of the display lens 5 defines the display area 12 of the light emitting surface 11.

In the light emitting device 1 having the configuration described above, when the LEDs 21 of the light source 2 are lit, the light radiated from the LEDs 21 is made incident on the side surface 31 of the light guide plate 3. The light guide plate 3 covered by the light reflecting layer 63 of the supporting member 6 guides the irradiation light from the LEDs 21 toward the upper surface 30 of the light guide plate 3 to be made incident on the diffusion sheet 4. The irradiation light from the LEDs 21 is made incident on the diffusion sheet 4, through the light guide plate 3, to be diffused. Then, the resultant light is made incident on the display lens 5 to be focused on the protrusion 511 of the display lens 5, and then is emitted outside from the protrusion 511. With the light from the light source 2 guided to and emitted from the protrusion 511 of the display lens 5, the luminescent display, corresponding to the luminescent pattern of the light source 2, is displayed on the display area of the light emitting surface 11 of the light emitting device 1.

Second Embodiment

Figure 5:
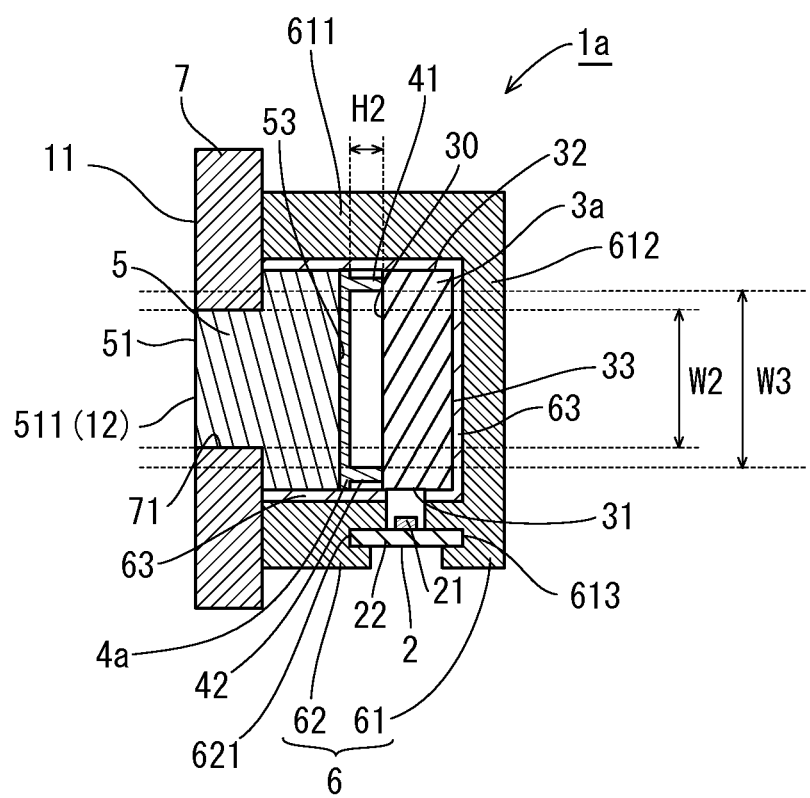
FIG. 5 is a schematic cross-sectional view showing a configuration of a light emitting device according to a second embodiment of the present invention.

A second embodiment of the present invention will be described by referring to a drawing. FIG. 5 is a cross-sectional view showing a configuration of a light emitting device according to this embodiment. In the light emitting device according to this embodiment, components that are the same as the components in of the light emitting device of the first embodiment are denoted with the same reference numerals, and will not be elaborated here.

A light emitting device 1a according to this embodiment is different from the light emitting device 1 (see FIG. 2) according to the first embodiment in that a light guide plate 3a having the upper surface 30 as a flat surface is provided, and a diffusion sheet 4a is disposed on the upper surface 30 of the light guide plate 3a. The diffusion sheet 4a includes protrusions 41 and 42 protruding toward the light guide plate 3a, on the rear surface. On the rear surface of the diffusion sheet 4a, protrusions 41 and 42 each extend along the longitudinal direction of the light emitting device 1a, at a position further on the outer side than the protrusion 511, of the display lens 5, serving as the display area 12. Specifically, the protrusions 41 and 42 are disposed at positions close to the respective side surfaces 31 and 32 of the light guide plate 3a, and an installation width W3 between the protrusions 41 and 42 is larger than the width W2 of the display area 12 (protrusion 511).

As described above, in the light emitting device 1a, the diffusion sheet 4a is disposed with the protrusions 41 and 42 in contact with the upper surface 31 of the light guide plate 3a. Thus, a gap defined by a height H2 of the protrusions 41 and 42 is formed between the light guide plate 3a and the diffusion sheet 4a. The height H2 of the protrusions 41 and 42 is set to be not larger than 0.1 mm, similarly to the depth H1 of the recess 311 of the light guide plate 3 in the light emitting device 1 (see FIG. 2) according to the first embodiment. Thus, the foreign object such as dust is prevented from being in pressure contact with the light guide plate 3 and the diffusion sheet 4. Furthermore, the height H2 of the protrusions 41 and 42 is preferably set to be not larger than 30 mm to achieve the optimum light emitting range in the display area 12. In the light emitting device 1a according to this embodiment formed as the side light emitting device, the height H2 is more preferably set to be not larger than 5 mm.

Third Embodiment

Figure 6:
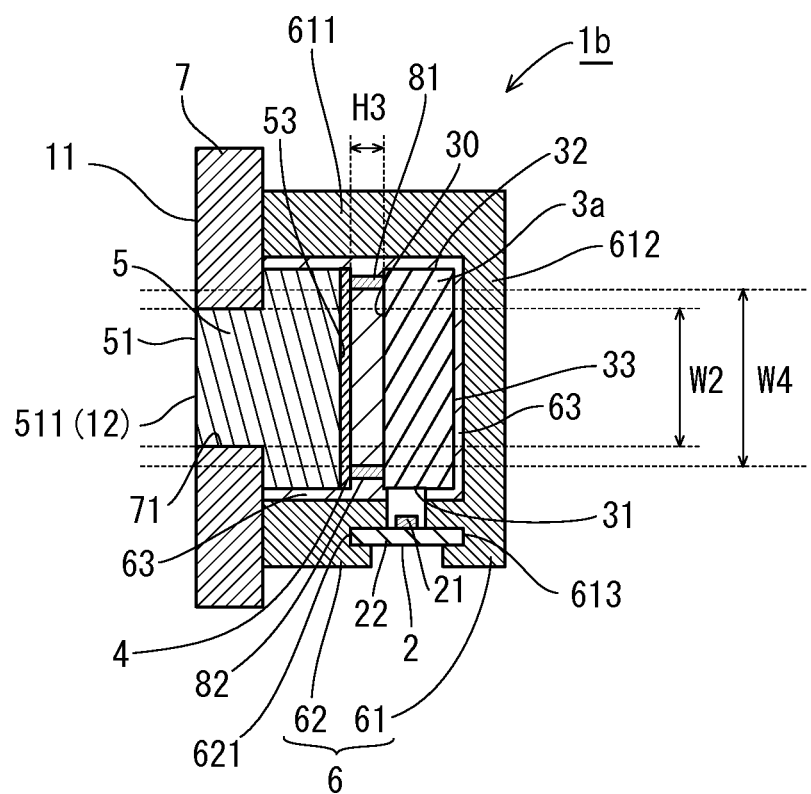
FIG. 6 is a schematic cross-sectional view showing a configuration of a light emitting device according to a third embodiment of the present invention.

A third embodiment of the present invention will be described by referring to a drawing. FIG. 6 is a cross-sectional view showing a configuration of a light emitting device according to this embodiment. In the light emitting device according to this embodiment, components that are the same as the components of the light emitting device of the first embodiment are denoted with the same reference numerals, and will not be elaborated here.

The light emitting device 1b according to this embodiment includes the diffusion sheet 4 in the light emitting device 1 (see FIG. 2) according to the first embodiment and the light guide plate 3a in the light emitting device 1a (see FIG. 5) according to the second embodiment. Furthermore, spacers 81 and 82 are disposed between the light guide plate 3a and the diffusion sheet 4. The spacers 81 and 82 each have a shape of a bar extending in the direction that is the same as the longitudinal direction of the light emitting device 1b, and is disposed at a position further on the outer side than the protrusion 511 of the display lens 5, serving as the display area 12. Specifically, the spacers 81 and 82 are disposed at positions close to the respective side surfaces 31 and 32 of the light guide plate 3a, and an installation width W4 between the spacers 81 and 82 is larger than the width W2 of the display area 12 (protrusion 511).

As described above, in the light emitting device 1b, the diffusion sheet 4 is disposed on the upper surface 30 of the light guide plate 3a with the spacers 81 and 82 disposed in between. Thus, a gap defined by a height H3 of the spacers 81 and 82 is formed between the light guide plate 3a and the diffusion sheet 4. The height H3 of the spacers 81 and 82 is set to be not smaller than 0.1 mm and not larger than 30 mm, similarly to the depth H1 of the recess 311 of the light guide plate 3 in the light source device 1 (see FIG. 2) according to the first embodiment, and is more preferably set to be not smaller than 0.1 mm and not larger than 5 mm, when the light emitting device 1b is formed as the side light emitting device.

Fourth Embodiment

Figure 7:
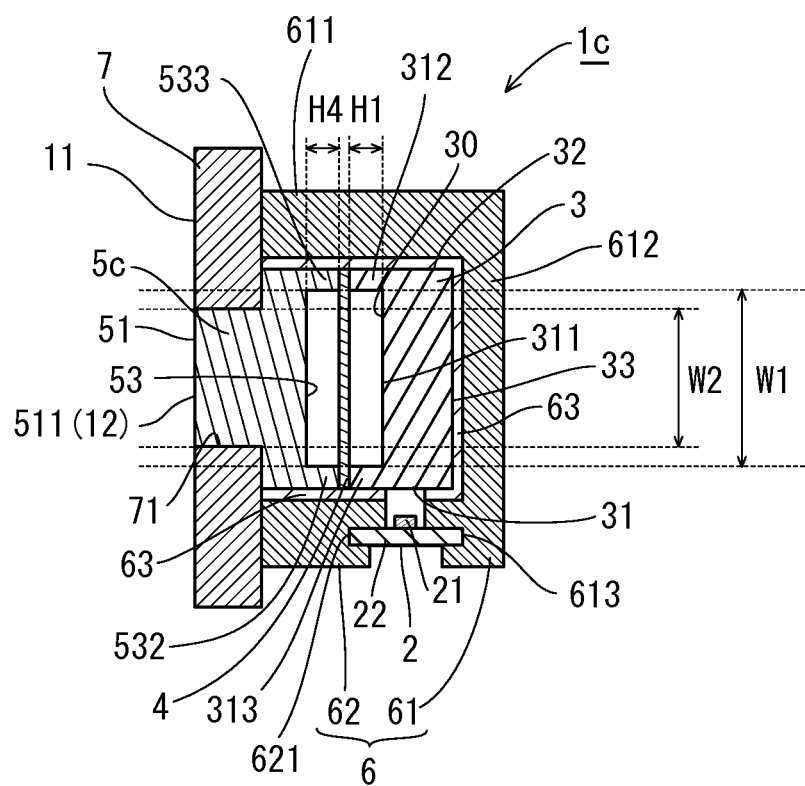
FIG. 7 is a schematic cross-sectional view showing a configuration of a light emitting device according to a fourth embodiment of the present invention.

A fourth embodiment of the present invention will be described by referring to a drawing. FIG. 7 is a cross-sectional view showing a configuration of a light emitting device according to this embodiment. In the light emitting device according to this embodiment, components that are the same as the components of the light emitting device of the first embodiment are denoted with the same reference numerals, and will not be elaborated here.

As shown in FIG. 7, a light emitting device 1c according to this embodiment includes a display lens 5c provided with a recess 531 on a bottom surface 53, instead of the display lens 5 of the light emitting device 1 (see FIG. 2) according to the first embodiment. Thus, a gap is also formed between the diffusion sheet 4 and the display lens 5c. Similarly to the upper surface 30 of the light guide plate 3, the bottom surface 53 of the display lens 5c includes protrusions 532 and 533, formed by making the both side edges, along the longitudinal direction of the bottom surface 53, protrude toward the diffusion sheet 4. The recess 531 is disposed at a position between the protrusions 532 and 533 at both end sides.

As described above, the light emitting device 1c includes the recess 531 on the bottom surface 53 of the display lens 5c. Thus, the gap is also formed between the diffusion sheet 4 and the display lens 5c. The recess 531 of the display lens 5c preferably has a width that is the same as the width W1 of the recess 311 of the light guide plate 3, and a depth H4 not smaller than 0.1 mm. Thus, also the foreign object between the display lens 5c and the diffusion sheet 4 is prevented from being in pressure contact with the display lens 5c and the diffusion sheet 4.

The light emitting device 1c includes the light guide plate 3 and the diffusion sheet 4, similarly to the light emitting device 1 of the first embodiment. Alternatively, the light emitting device 1c may include the light guide plate 3a and the diffusion sheet 4a, similarly to the light emitting device 1a of the second embodiment, or may include the light guide plate 3a, the diffusion sheet 4, and the spacers 81 and 82, as in the third embodiment. In the light emitting device 1c according to this embodiment, the recess is formed in the display lens so that the gap is defined between the display lens and the diffusion sheet. Furthermore, a protrusion may be formed on the surface of the diffusion sheet, so that the gap is defined between the display lens and the diffusion sheet, and a spacer may be disposed between the display lens and the diffusion sheet so that the gap is defined.

In the embodiments described above, the light emitting devices 1, and 1a to 1c each have the gap, with the height higher than the foreign object, above or below the diffusion sheet 4 or 4a. Thus, the foreign object does not come into close contact with each of the light guide plates 3 and 3a, the diffusion sheets 4 and 4a, and the display lenses 5 and 5a. Thus, in the light emitting devices 1, and 1a to 1c of the embodiments described above, irregular light emission due to the foreign object in pressure contact between the light guide plate and the diffusion sheet, or between the diffusion sheet and the display lens, does not occur unlike in the conventional case. Thus, in the light emitting devices 1, and 1a to 1c of the embodiments described above, even when the foreign object enters the gap formed above or below the diffusion sheet 4 or 4a, the light is not guided by the foreign object. This eliminates or minimizes the degradation of the quality of the luminance display such as lighting of an area irrelevant with the luminance pattern of the light source 2.

In the light emitting devices 1, and 1a to 1c of the embodiments described above, the gap formed above or below the diffusion sheet 4 or 4a has a tubular shape penetrating from one end surface to the other end surface. Thus, it is possible to add a step of blowing air from the one end surface after the gap is formed above or below the diffusion sheet 4 or 4a while the light emitting devices 1, and 1a to 1c are being fabricated, for example. This ensures that the foreign object that has entered the gap is discharged outside the light emitting devices 1, and 1a to 1c and thus eliminated. After the foreign object is eliminated from the gap, both end of the supporting member 6 in the light emitting devices 1, and 1a to 1c are sealed, thereby preventing a foreign object from entering the device thereafter.

In the light emitting devices 1, and 1a to 1c of the embodiments described above, the light source 2 includes a plurality of LEDs 21. However, this should not be construed as a limiting sense. Other light sources such as a cathode ray tube and a fluorescent light may be used.

<State Display Device>

Figure 8:
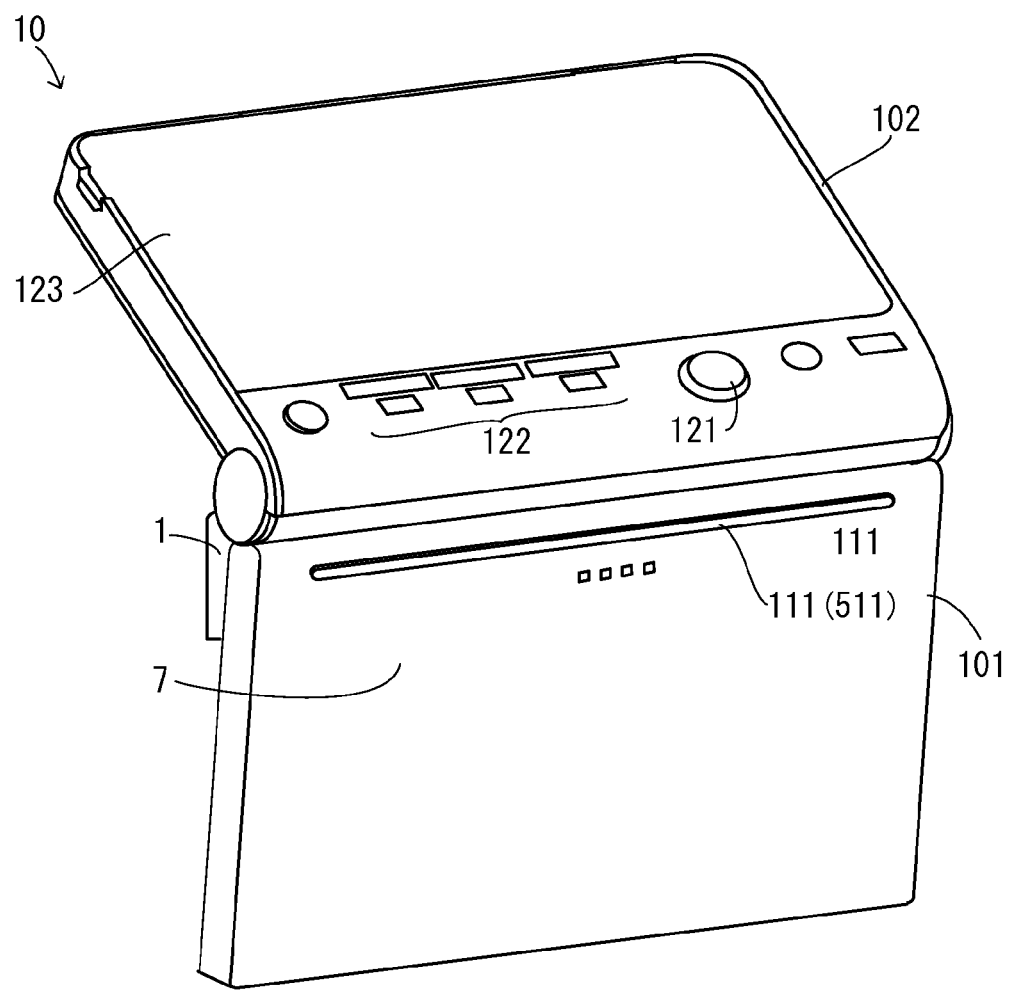
FIG. 8 is an outer perspective view showing a configuration of an operation device including a state display device formed by the light emitting device of the present invention.
Figure 9:
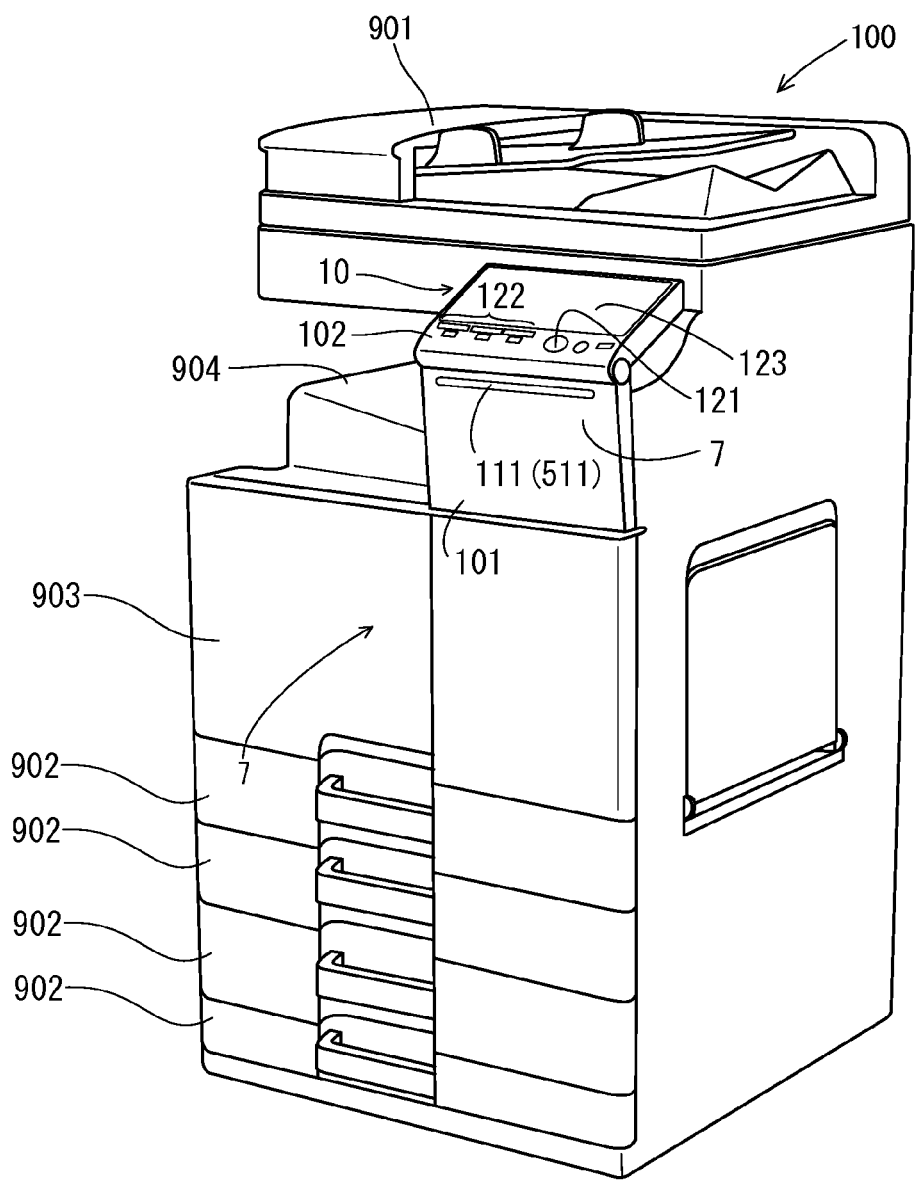
FIG. 9 is an outer perspective view of an image forming apparatus including the operation device shown in FIG. 8.
Figure 10:
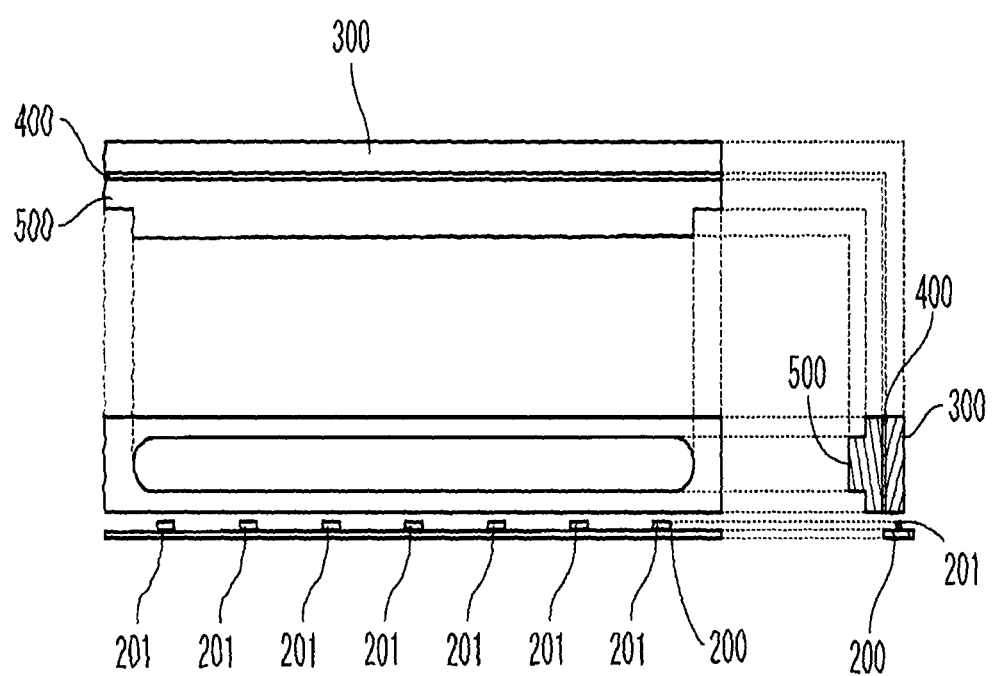
FIG. 10 is a schematic diagram showing a configuration of a conventional light emitting device.

An embodiment of the state display device using any of the light emitting device of the embodiments described above will be described with reference to a drawing. FIG. 8 is an outer perspective view showing a configuration of an operation device including the state display device. FIG. 9 is an outer perspective view showing a configuration of an image forming apparatus including the operation device shown in FIG. 8. As the state display device described in this embodiment, the light emitting device 1 in the first embodiment is used. Alternatively, any one of the light emitting devices 1a to 1c in the second to the fourth embodiments may be used.

An operation device 10 shown in FIG. 8 includes a state display device 101 and a liquid crystal operation device 102. The state display device 101 is formed by mounting the light emitting device 1 to the casing 7. The liquid crystal operation device 102 is coupled to one side of the state display device 101. In the state display device 101, the protrusion 511 (see FIG. 2) of the display lens 5 is exposed on the surface of the casing 7, when the light emitting device 1 is mounted. Thus, the protrusion 511 of the display lens 5 serves as a luminescent display 111 indicating an operation state of an apparatus (an image forming apparatus in this embodiment) including the operation device 10. The liquid crystal operation device 102 includes a power switch 121 for instructing the power supply start of the apparatus (an image forming apparatus in this embodiment) including the operation device 10, a group of keys 122 for specifying various functions of the apparatus, and a liquid crystal display 123 with a touch panel function.

The apparatus provided with the operation device 10 having the configuration described above is described below with an image forming apparatus 100 shown in FIG. 9 as an example. The image forming apparatus 100 shown in FIG.

9 includes an image reader 901, a sheet feed tray 902, an image forming device 903, a collection tray 904, and the operation device 10. The image reader 901 reads an image from a document model. The sheet feed tray 902 accommodates a recording medium on which an image is to be formed. The image forming device 903 forms the image on the recording medium fed from the sheet feed tray 902. The recording medium having the image formed in the image forming device 903 is discharged onto the collection tray 904. The operation device 10 receives an operation to the image forming apparatus 100.

How the image forming apparatus 100 forms a toner image on the recording medium based on electrophotography is exemplified. Specifically, in the image forming device 903, the toner image, formed on an image carrier such as a photoreceptor, is transferred onto the recording medium fed from the sheet feed tray 902. Then, the recording medium, onto which the toner image is transferred, is heated and pressed so that the toner image on the recording medium is fixed. The recording medium having the image thus formed in the image forming device 903 is discharged to the collection tray 904 disposed above the image forming device 903.

When an image forming operation to the recording medium is performed as described above, the state display device 101 of the operation device 10 is operated to indicate the state of feeding the recording medium from the sheet feed tray 902 and then discharging the recording medium to the collection tray 904. Here, the state display device 101 is disposed to have the longitudinal direction of the light emitting device 1 extending in parallel with the discharge direction of the recording medium to the collection tray 902, as shown in FIG. 9, for example. For example, the LEDs 21 (see FIG. 3) in the light source 2 in the light emitting device 1 are sequentially lit in the same direction as the discharge direction. Thus, a lit portion in the luminescent display 111 moves in the same direction as the discharge direction. By thus moving the lit portion of the luminescent display 111 in accordance with the conveyance speed of the recording medium in the image forming apparatus 100, the state display device 101 is able to notify the user of a state of the image forming operation in the image forming apparatus 100.

The state display device that notifies the conveyance state of the recording medium in the image forming apparatus, as in the embodiment described above, is exemplified as the state display device using the light emitting device of any of the embodiments. The information notified by the state display device is not limited to the conveyance state of the recording medium. The state display device may be used to notify other states, such as a case where whether the power is supplied, a case where the transmission/reception state of the fax machine is notified, and a case where the reading state of the scanner is notified. The apparatus incorporating the state display device is not limited to the image forming apparatus exemplified in the embodiment described above. The state display device may be incorporated in an apparatus such as an automobile and a working machine, and indicate the state of the apparatus incorporating the state display device.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A light emitting device comprising:
   a light source configured to perform light emission;
   a light guide plate configured to guide light from the light source;
   a diffusion sheet stacked over the light guide plate, and configured to diffuse the light guided by the light guide plate; and
   a lens stacked on the diffusion sheet and comprising an upper surface serving as a light emitting surface,
   wherein the light guide plate comprises
      a first protrusion integrally formed on a surface of the light guide plate facing the diffusion sheet, at a position adjacent one side of the light guide plate, and
      a second protrusion integrally formed on the surface of the light guide plate, at a position adjacent the opposite side of the light guide plate,
   wherein the protrusions are in contact with the diffusion sheet so as to define a gap between the light guide plate and the diffusion sheet within the entirety of the area between the first and second protrusions.

2. The light emitting device according to claim 1, wherein the light source is disposed on a side surface of the light guide plate.

3. The light emitting device according to claim 2,
   wherein the light source comprises a plurality of light emitting diodes arranged in a row, and
   wherein each of the light emitting diodes is individually controlled to be lit.

4. The light emitting device according to claim 1,
   wherein the light source comprises a plurality of light emitting diodes arranged in a row, and
   wherein each of the light emitting diodes is individually controlled to be lit.

5. The light emitting device according to claim 1, wherein a gap is defined between the lens and the diffusion sheet.

6. An image forming apparatus configured to form an image on a recording medium and discharge the recording medium, the image forming apparatus comprising a state display device configured to display, as a notification to an outside, an operation state of the image forming apparatus, the state display device comprising the light emitting device according to claim 1.

7. The light emitting device according to claim 1, wherein the light guide plate comprises a recess formed on a surface of the light guide plate facing the diffusion sheet, so as to define the gap between the recessed surface of the light guide plate and the diffusion sheet.

8. A light emitting device, comprising:
   a light source configured to perform light emission;
   a light guide plate configured to guide light from the light source;
   a diffusion sheet stacked over the light guide plate, and configured to diffuse the light guided by the light guide plate; and
   a lens stacked on the diffusion sheet and comprising an upper surface serving as a light emitting surface,
   wherein the diffusion sheet comprises
      a first protrusion integrally formed on a surface of the diffusion sheet, at a position adjacent one side of the diffusion sheet, and
      a second protrusion integrally formed on the surface of the diffusion sheet, at a position adjacent the opposite side of the diffusion sheet, wherein the protrusions are in contact with the light guide plate so as to define a gap between the light guide plate and the diffusion sheet within the entirety of the area between the first and second protrusions.

9. The light emitting device according to claim 8, wherein the light source is disposed on a side surface of the light guide plate.

10. The light emitting device according to claim 8,
wherein the light source comprises a plurality of light emitting diodes arranged in a row, and
wherein each of the light emitting diodes is individually controlled to be lit.

11. The light emitting device according to claim 8, further comprising a casing covering an outer periphery of the light emitting surface of the lens so as to define a display area in a center area of the light emitting surface of the lens, the display area allowing the light from the light source to pass through the display area,
wherein the display area is an area smaller than an area of the gap, and is positioned above the gap.

12. The light emitting device according to claim 8, wherein the diffusion sheet comprises a recess formed on a surface of the diffusion sheet, so as to define the gap between the light guide plate and the recessed surface of the diffusion sheet.

13. A light emitting device, comprising:
a light source configured to perform light emission;
a light guide plate configured to guide light from the light source;
a diffusion sheet adjacent to and stacked over the light guide plate with a gap defined between the light guide plate and the diffusion sheet adjacent to the light guide plate, and configured to diffuse the light guided by the light guide plate;
a lens stacked on the diffusion sheet and comprising a protrusion which includes an upper surface serving as a light emitting surface; and
a casing covering an outer periphery of the light emitting surface of the lens so as to define a display area in a center area of the light emitting surface of the lens, the display area allowing the light from the light source to pass through the display area,
wherein the display area is an area smaller than an area of the gap, and is positioned above the gap, and
the protrusion is disposed in an opening formed on the casing, such that the casing surrounds a side surface of the protrusion.

14. The light emitting device according to claim 13, wherein a spacer is disposed between the light guide plate and the diffusion sheet so as to define the gap between the light guide plate and the diffusion sheet.

15. The light emitting device according to claim 14, wherein the light source is disposed on a side surface of the light guide plate.

16. The light emitting device according to claim 14,
wherein the light source comprises a plurality of light emitting diodes arranged in a row, and
wherein each of the light emitting diodes is individually controlled to be lit.

17. The light emitting device according to claim 14, further comprising a casing covering an outer periphery of the light emitting surface of the lens so as to define a display area in a center area of the light emitting surface of the lens, the display area allowing the light from the light source to pass through the display area,
wherein the display area is an area smaller than an area of the gap, and is positioned above the gap.

* * * * *